[19] United States Patent
Hoffmeyer et al.

[11] 3,826,530
[45] July 30, 1974

[54] RIDING TRACTOR
[75] Inventors: Knud H. Hoffmeyer, Racine; Sherman C. Heth, Sturtevant, both of Wis.
[73] Assignee: Jacobsen Manufacturing Company, Racine, Wis.
[22] Filed: July 3, 1972
[21] Appl. No.: 268,519

[52] U.S. Cl............. 296/65 R, 180/1 F, 180/89 R, 280/282, 280/150 C
[51] Int. Cl............................................ B60n 1/08
[58] Field of Search............. 180/89, 1 F, 54 D, 25, 180/27; 280/282, 267, 150 C; 296/65 R, 28 F, 28 J, 28 B

[56] References Cited
UNITED STATES PATENTS

| 273,007 | 2/1883 | Baker................................. | 280/282 |
| 449,111 | 3/1891 | Edelstein........................... | 280/267 |
| 2,928,682 | 3/1960 | Spencer et al................. | 280/267 X |
| 2,989,134 | 6/1961 | Kamlukin et al.................. | 180/1 F |
| 3,066,907 | 12/1962 | Latimer et al. ............... | 196/65 R X |
| 3,188,111 | 6/1965 | Ells et al. ........................ | 280/150 C |
| 3,311,186 | 3/1967 | Kamlukin........................ | 180/54 D |
| 3,402,941 | 9/1968 | Martinmass..................... | 280/150 C |
| 3,648,797 | 3/1972 | Lukins .............................. | 180/89 R |

FOREIGN PATENTS OR APPLICATIONS

| 659,472 | 3/1963 | Canada............................... 280/282 |

OTHER PUBLICATIONS

John Deere, Gasoline Tractor, Pages 7 & 8, Received 11/14/60.

Primary Examiner—David Schonberg
Assistant Examiner—John P. Silverstrim
Attorney, Agent, or Firm—Arthur J. Hansmann

[57] ABSTRACT

A riding tractor having ground wheels supporting spaced-apart beams forming the tractor frame, and having a forwardly located engine and a rearwardly located operator's seat. The beams extend inclined upwardly, and a member connects the rear portions of the beams, and the operator's seat is slidably supported on tracks which are on an incline parallel to that of the beam rear portions. The member connecting the beams also extends downwardly and supports the rear wheel axle, and a sheet piece is interposed between the beam rear portions and the operator's seat, and the sheet piece has lateral portions which extend over the rear wheels to present rear fenders. The engine is located over the front wheel axle, and the operator's seat is over the rear wheel axle, and provision is made for inclusion of a roll-bar.

10 Claims, 4 Drawing Figures

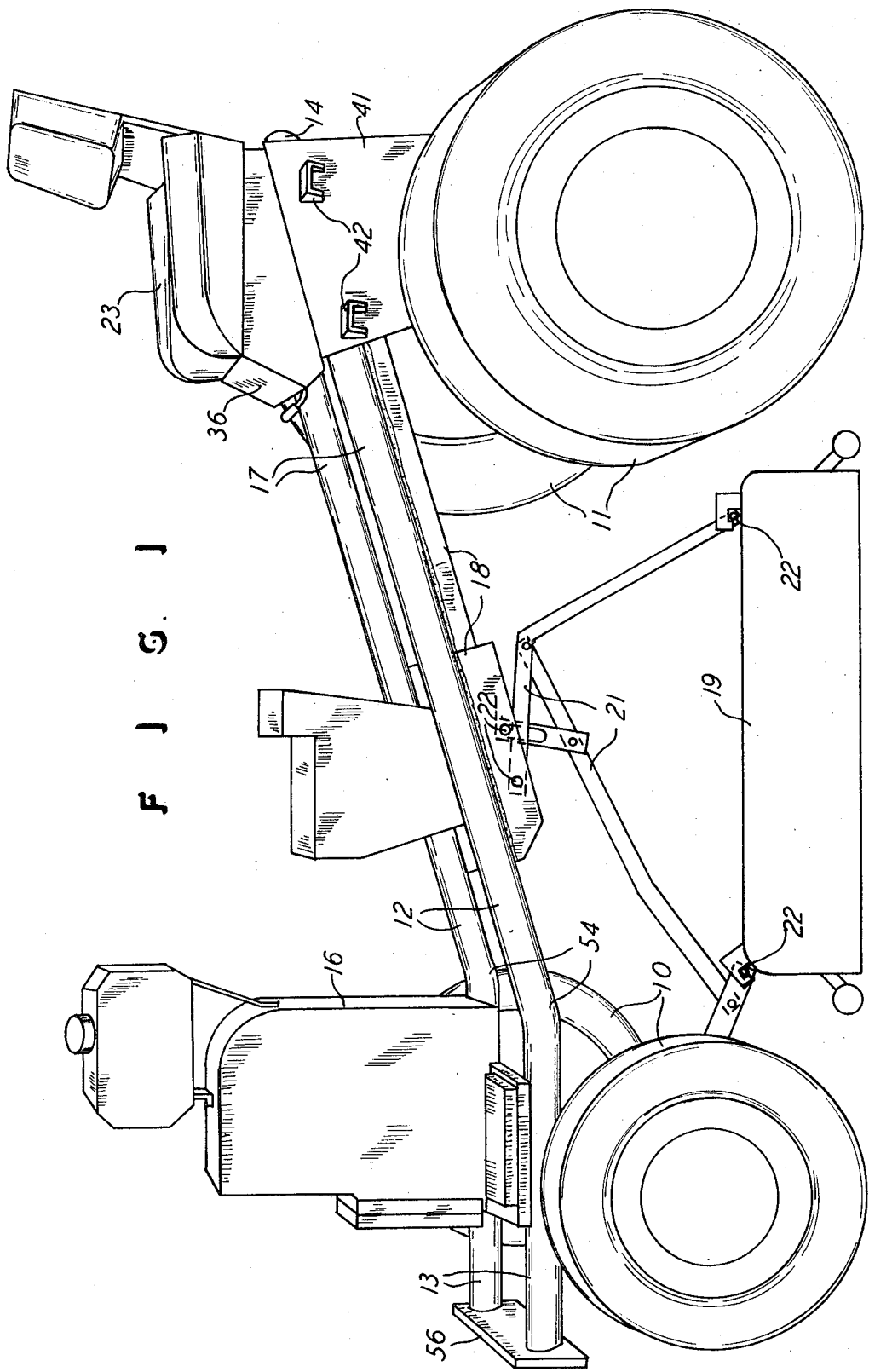

PATENTED JUL 30 1974 3,826,530
SHEET 2 OF 2
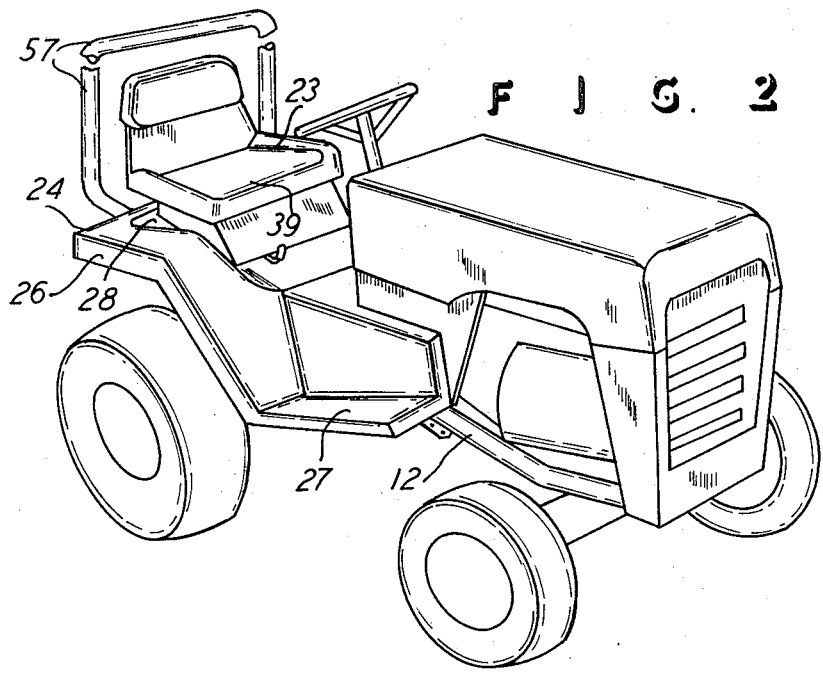
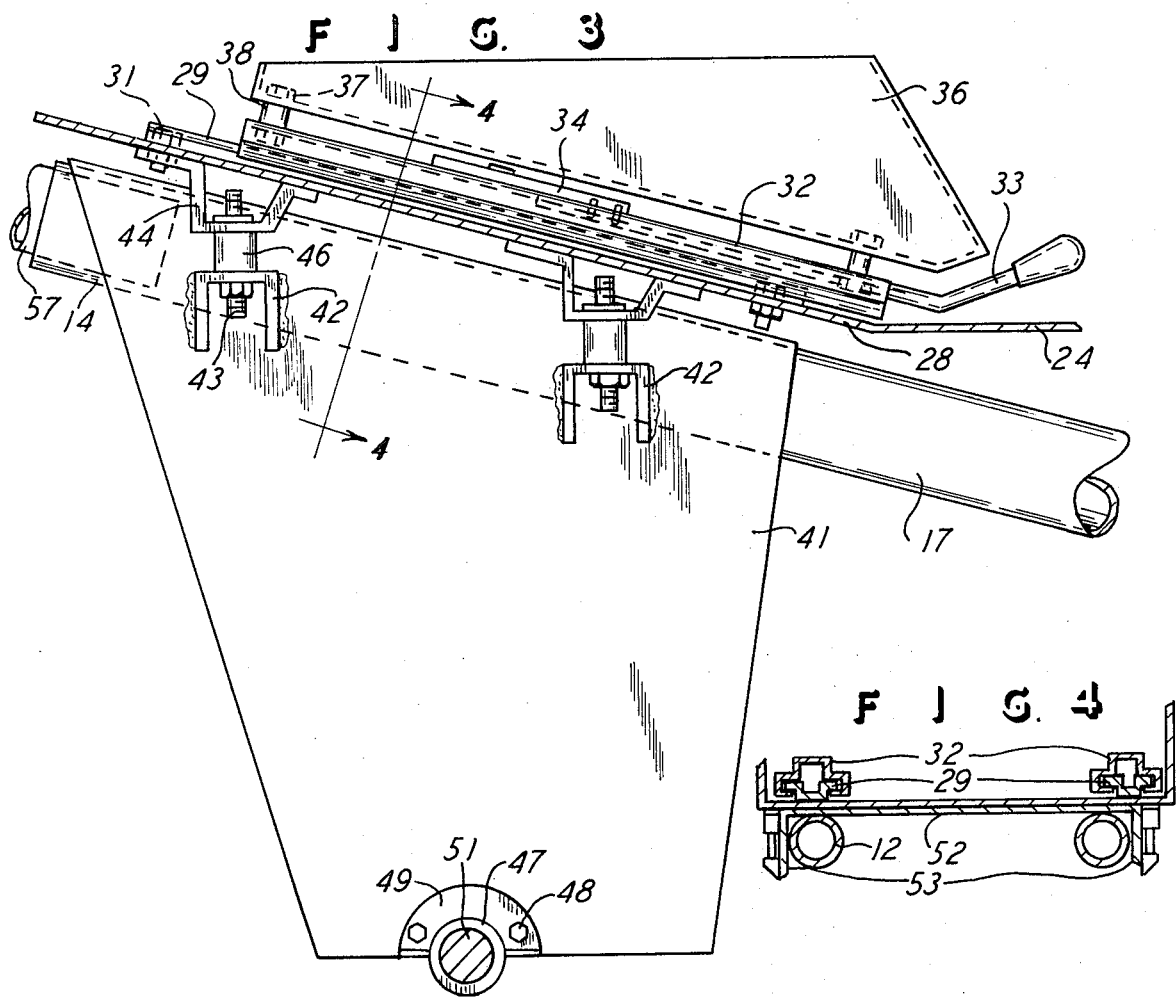

RIDING TRACTOR

This invention relates to a riding tractor of the type which is used to movably support working implements, including lawn mowers, snow throwers, and the like.

BACKGROUND OF THE INVENTION

Riding tractors used for powering and supporting working implements are commonly known in the art. These tractors are referred to as garden tractors, and they are used for lawn maintenance work and for snow removal and like projects. The problems and concern in designing and manufacturing these tractors include providing the tractor with a stable and sturdy frame which adequately supports the engine and the operator's seat and the operator himself. Further, the design of these tractors involves the concern of making an efficiently operating tractor which has the arrangement of the essential parts, such as frame and wheel axle supports and operator's seat supports, in a manner which lends itself to ease of manufacture and strength and maneuverability of the tractor. Still further, the tractors of this type should be arranged so that the operator can comfortably and properly be seated on the tractor in a position so that he can observe a maximum amount of ground around the location of the tractor.

Accordingly, it is a primary object of this invention to provide a tractor which is designed with the aforementioned considerations in mind. That is, the tractor of this invention is sturdy, arranged for maximum operator comfort and visibility, and is arranged for optimum accommodation and support of implements attached to the tractor.

In achieving the aforementioned objectives, the tractor of this invention is provided with inclined side beams which form the tractor frame or chassis, and the operator's seat is supported on tracks which are also likewise inclined, and the seat is adjustable along the incline so that the operator can position the seat and therefore position himself for maximum control of the tractor and for optimum visibility from the operator's seat. Still further, the side beams forming the tractor frame have a member connected thereto and providing support for the rear wheel axle and also for the tractor operator's seat. Still further, a sheet member is interposed between the operator's seat and the tractor rear wheels, and the sheet piece forms the dual purpose of being a foot rest for the operator and also being the fenders extending over the rear wheels, all in a compact arrangement with the remainder of the tractor so that the operator's visibility is of a maximum amount.

The entire tractor is arranged to be balanced with the engine of the front axle and with the operator's seat over the rear axle, and there is provision for a roll-bar extending over the operator's seat to protect the operator in the event that the tractor tips over.

Other objects and advantages will become apparent upon reading the following disclosure in light of the accompanying drawing.

BRIEF DESCRIPTION OF THE DRAWINGS

FIG. 1 is a side perspective view of the tractor of this invention and showing the tractor frame and engine and seat.

FIG. 2 is a front perspective view of the tractor shown in FIG. 1, but with the entire tractor being shown in FIG. 2.

FIG. 3 is an enlarged right side elevational view of the tractor chassis shown in FIG. 1, and with a part thereof being sectioned.

FIG. 4 is a sectional view taken on the line 4—4 of FIG. 3.

DETAILED DESCRIPTION OF THE PREFERRED EMBODIMENT

The tractor is shown to include the two front ground wheels 10 and the two rear ground wheels 11 which are suitably connected with and arranged to support the tractor frame which includes the two side beams 12. The beams 12 are tubular in shape, and they extend in the fore-and-aft direction of the tractor at the two sides thereof. Thus, the beams extend from their forwardly located ends 13 and to their rearward ends 14. Also, it will be seen that the forward portions of the beams 12 are horizontally disposed, and these portions support an engine 16, and the remainder and rear ends of the beams 12 are inclined upwardly through the rear portions 17. Still further, reinforcing plates, such as the plates 18, are shown welded to the beams 12 and extend underneath for providing implement mounting arrangements and for reinforcing the beam members 12. Thus, a rotary type lawn mower 19 is shown suspended under the tractor center portion by means of the several links 21 which pivotally mount on the reinforcing plate 18 and extend downwardly to the mower 19. The entire arrangement is such that the beams 12 are inclined upwardly and therefore provide ample space for the mounting links 21 and for the mower 19. The high bridge arrangement of the tractor frame presented by the beams 12 at the mid-section of the entire tractor, as seen in FIG. 1, also permits ready and easy attachment and detachment of the implement 19, since the links 21 are accessible and their attachment pins 22 are also readily accessible from the sides of the tractor.

The entire tractor is therefore arranged so that the engine 16 is disposed over the front of the tractor and above the front axle supporting the wheels 10, and there is an operator's seat 23 which is disposed over the tractor rear axle supporting the wheel 11. Thus, the side beams 12 can be provided and arranged as described and shown, and they are sufficiently sturdy to provide the frame for the tractor. FIG. 2 shows that the operator's seat 23 is disposed above the tractor body member which is a sheet piece 24 extending intermediate the seat 23 and the rear portions 17 of the side beams 12 and over the rear wheels 11. Thus the piece 24 is a single sheet piece which has the wheel fender portions, such as the right-hand fender portion 26 extending over the wheels 11. Also, the piece 24 has the operator's foot rest portions on each side of the tractor, such as the shown right-hand foot rest portion 27. The intermediate portion of the sheet piece 24 has a well portion 23 wherein the operator's seat 23 is nested.

FIGS. 3 and 4 show the well portion 28 supporting seat tracks 29 which are affixed to the portion 28 by bolts 31. The tracks 29 are spaced apart and are at the angle of inclination like the incline of the beam portions 17. A seat support member 32 is engaged with each track 29 to slide on the tracks 29 and thereby have the seat adjustably supported from the tractor frame so that the seat 23 can slide fore-and-aft of the tractor axis and will be adjustable in elevation during the sliding motion. A lever 33 extends to a latch type of connector 34 which secures the seat relative to the track 29, and the arrangement of the lever 33 and the connector 34 can be any conventional arrangement for this type of releasable slide as shown and described. A seat pedestal 36 is secured to the seat slide members 32 by means of the bolts 37 and the several spacer members 38 which extend between the pedestal 36 and the slide members 32. The seat cushions 39 are suitably supported on the pedestal 36 and are shown horizontally disposed.

A member 41 is suitably connected to the side beam rear ends 14, such as by welding, and the member 41 extends downwardly from each side of the two beams 12. Support pads 42 are shown welded to the member 41, and a threaded stud 43 extends from each pad 42 and connects to a bracket 44 which in turn is secured, such as by welding, to the sheet piece 24. Thus the piece 24 is supported on the brackets and pads described and it is therefore supported from the beams 12. Resilient shock members 46 are interposed between the pads 42 and the brackets 44, and thus the operator's seat 23 has additional shock-absorbing mounting.

The lower end of the member 41 supports a sleeve 47, by means of bolts 48 attached to a flange 49 on the sleeve 47 and to the member 41. The sleeve 47 thus provides the mounting for the tractor rear axle 51. FIG. 4 shows that the member 41 may be an inverted U-shaped member having an intermediate portion 52 extending between the two depending side portions 53 of the member 41. Thus, the beams 12 are secured in their spaced-apart position, and a sturdy framework is therefore provided.

The riding tractor is therefore arranged with a simplified but sturdy frame presented by the beams 12 which have the forward horizontal ends 13 and which commence to incline at the location designated 54, and that location is adjacent the front wheels 12, and the incline continues through the remainder 17 of the beams 12. The arrangement is such that the major weight on the frame is over the front wheel axle and over the rear wheel axle, and the intermediate portion of the frame can therefore have sufficient clearance below it to accommodate implements, such as the rotary lawn mower 19. Further, the beams 12 are secured together in a simplified but sturdy manner by means of the member 41 and by means of a plate 56 connecting the beam front ends 13. The sheet piece 24 is arranged to provide the necessary vehicle body and fenders and foot rests, and the piece 24 also is utilized to support the seat 23 which is suitably resiliently or shock-absorbing mounted. With the arrangement described, it will also be understood that the beam tubular pieces 12 have circular openings at their rear ends 14, and these openings are available and suitable for receiving other tubular pieces in telescopic relation so that these other pieces can extend upwardly over the seat 23 and provide a roll-bar safety arrangement for the operator occupying the seat 23. This roll-bar arrangement may be as seen and shown by the roll-bar designated 57, and it would preferably be U-shaped and in an inverted position to extend as a canopy over the operator's seat 23 and thus provide the usual protection against the tractor rolling on the operator in the event that the tractor tipped over.

What is claimed is:

1. A riding tractor comprising a frame having spaced-apart beam members extending fore-and-aft of the tractor along the sides thereof, front and rear ground wheels connected with said frame and being disposed at opposite ends of said beam members, said beam members being inclined from adjacent said front wheels and through the rearwardly extending portion of said beam members to terminate in an inclined rear portion adjacent said rear wheels, an operator's seat including a horizontally disposed seating portion, seat tracks affixed with said inclined rear portion and extending at the angle of incline of said rear portion, track engaging members affixed with said operator's seat and slidably engaged with said seat tracks for adjustably supporting said operator's seat along said inclined rear portion, a releasable seat-securing member for holding said seat in selected positions along said seat tracks, operator's foot rests affixed with said beam members for accommodating the feet of the operator, a sheet piece supported on said beam members and extending intermediate said operator's seat and said rear wheels and having fender portions extending above said rear wheels, a portion of said sheet piece including said footrests, said seat tracks being attached to said sheet piece and being supported therefrom.

2. The riding tractor as claimed in claim 1, including a support member connected to said rear portion of said beam members for securely positioning said beam members laterally apart, and said seat tracks being supported from said support member.

3. The riding tractor as claimed in claim 2, including a plurality of pads connected to said support member and each having an upwardly facing horizontal surface, and connectors extending between said pads and said seat tracks for supporting the latter on said pads.

4. The riding tractor as claimed in claim 2, and including a rear axle mounting connected to said support member for supporting said rear wheels.

5. The riding tractor as claimed in claim 3, and including a sheet piece supported on said pads and extending intermediate said operator's seat and said rear wheels and having fender portions extending above said rear wheels.

6. The riding tractor as claimed in claim 4, and including a sheet piece supported from said support member and extending thereover and having fender portions extending over said rear wheels.

7. A riding tractor comprising a frame having two tubular beam members extending along the sides of the tractor in the fore-and-aft direction of the tractor and terminating in an open rear end at the rear end of said tractor, front and rear ground wheels connected with said frame and being disposed at the opposite ends of said beam members, connectors at said opposite ends of said beam members for connecting said beam members together, an operator's seat supported on said frame and disposed at said rear end thereof, and a roll-bar insertable into said open rear end of said tubular beam members and extending over said operator's seat.

8. The riding tractor as claimed in claim 7, wherein said tubular beam members are cylindrical in shape and said roll-bar is cylindrical for telescopically nesting in said open rear end of said cylindrical beam members.

9. The riding tractor as claimed in claim 8, including reinforcing members affixed to said tubular beam members at the intermediate lengths thereof for reinforcing said beam members.

10. The riding tractor as claimed in claim 8, wherein said beam members are inclined upwardly at the rear of said tractor, and an adjustable seat support on said inclined beam members and at the angle of inclination of said beam members for adjustably supporting said seat.

* * * * *